(12) United States Patent
Yan

(10) Patent No.: US 10,184,061 B2
(45) Date of Patent: Jan. 22, 2019

(54) EFFICIENT WATERBORNE NANO-SILICON RUBBER SEALING WATERPROOF AGENT

(71) Applicant: Feihua Yan, Shenzhen (CN)

(72) Inventor: Feihua Yan, Shenzhen (CN)

( * ) Notice: Subject to any disclaimer, the term of this patent is extended or adjusted under 35 U.S.C. 154(b) by 0 days.

(21) Appl. No.: 15/511,015

(22) PCT Filed: Apr. 10, 2016

(86) PCT No.: PCT/CN2016/078918
§ 371 (c)(1),
(2) Date: Mar. 14, 2017

(87) PCT Pub. No.: WO2017/101237
PCT Pub. Date: Jun. 22, 2017

(65) Prior Publication Data
US 2018/0298225 A1 Oct. 18, 2018

(30) Foreign Application Priority Data
Dec. 18, 2015 (CN) .......................... 2015 1 0959932

(51) Int. Cl.
| | |
|---|---|
| *C09D 101/28* | (2006.01) |
| *C09D 175/04* | (2006.01) |
| *C09D 183/04* | (2006.01) |
| *C09K 3/12* | (2006.01) |
| *C09D 7/40* | (2018.01) |
| *C09D 7/65* | (2018.01) |
| *C09D 7/61* | (2018.01) |
| *C09D 7/63* | (2018.01) |

(52) U.S. Cl.
CPC ............ *C09D 101/28* (2013.01); *C09D 7/40* (2018.01); *C09D 7/61* (2018.01); *C09D 7/63* (2018.01); *C09D 7/65* (2018.01); *C09D 175/04* (2013.01); *C09D 183/04* (2013.01); *C09K 3/12* (2013.01); *C08L 2201/08* (2013.01); *C08L 2205/03* (2013.01); *C08L 2205/035* (2013.01)

(58) Field of Classification Search
CPC .......... C09D 101/28; C09D 7/65; C09D 7/61; C09D 7/63; C08L 2201/03; C08L 2205/03; C08L 2205/035
USPC ......................................................... 524/46
See application file for complete search history.

(56) References Cited

U.S. PATENT DOCUMENTS 7,687,121 B2 * 3/2010 Landon .................. B82Y 30/00
428/34

* cited by examiner

*Primary Examiner* — Hui H Chin
(74) *Attorney, Agent, or Firm* — Wayne & Ken, LLC; Tony Hom

(57) ABSTRACT

The present invention relates to an efficient waterborne nano-silicon rubber sealing waterproof agent, comprising following components in parts by weight: 10~90 parts of nano-silica gel, 10~100 parts of nano-diatomaceous earth, 5~150 parts of nano polyurethane, 15~200 parts of nano inorganic dry powder, 10~100 parts of nano methyl cellulose, 10~150 parts of a chelating agent, 15~200 parts of an expansion agent, 10~250 parts of a strengthening agent, 5~100 parts of an antifreezing agent, 2~150 parts of a heat-resistant agent and 10~100 parts of an acid and alkali-resistant agent. The efficient waterborne nano-silicon rubber sealing waterproof agent has good waterproofness, permeability, film forming property, elasticity, adhesion, water resistance and heat, humid and high temperature resistance, is suitable for being used for waterproof, anti-seepage and anti-leakage repair projects of underground engineering and roofing, and is an excellent vapor barrier material in a refrigerating chamber.

21 Claims, No Drawings

EFFICIENT WATERBORNE NANO-SILICON RUBBER SEALING WATERPROOF AGENT

TECHNICAL FIELD

The present invention relates to a sealing waterproof agent, and more specifically, to an efficient waterborne nano-silicon rubber sealing waterproof agent.

BACKGROUND OF THE PRESENT INVENTION

In recent years, especially during "the ninth Five-Year plan", novel waterproof plugging materials in China have been developed rapidly, many products with better quality and good economy have been formed by further developing new foreign technologies and products. Currently, the waterproof plugging materials in China have been developed from single paper-based asphalt felt product to waterproof material products with good level, varieties and function, including modified asphalt waterproof roll, high polymer waterproof sheet, waterproof paint, building sealing materials and rigid waterproof plugging materials etc. And the modified waterproof asphalt felt roll is growing faster, and high polymer waterproof material has developed to a certain degree. Therefore, there are more choices for waterproof plugging materials of various projects.

Qualified waterproof materials shall: (1) endure certain mechanical crash and not be damaged; (2) have durability and corrosion resistance; (3) have compact waterproof membrane; (4) be heat resistant and antifreezing resistant; (5) have easy construction and little joint; and (6) have good economy.

Common waterproof plugging materials in China include waterproof roll, waterproof paint, sealing material and anti-seepage plugging material etc. And the waterproof roll includes paper-based asphalt felt, SBS and IP modified asphalt waterproof roll etc. Besides, high polymer waterproof sheet such as EPDM, PVC, chlorinated polyethylene and chlorinated polyethylene blended with rubber etc. has a certain scale, however, some problems are existed in application and popularization.

SUMMARY OF THE PRESENT INVENTION

The present invention provides an efficient waterborne nano-silicon rubber sealing waterproof agent to solve the problems of the prior art, which has characteristics of rapid leakage repairing, waterproofness, firmness, durability, no toxicity, no odor, no radiance, heat resistance, freezing tolerance, acid resistance, alkali resistance, oil resistance, green and environmental protection.

The efficient waterborne nano-silicon rubber sealing waterproof agent of the present invention comprises following components in parts by weight:
  10~90 parts of nano-silica gel,
  10~100 parts of nano-diatomaceous earth,
  5~150 parts of nano polyurethane,
  15~200 parts of nano inorganic dry powder,
  10~100 parts of nano methyl cellulose,
  10~150 parts of a chelating agent,
  15~200 parts of an expansion agent,
  10~250 parts of a strengthening agent,
  5~100 parts of an antifreezing agent,
  2~150 parts of a heat-resistant agent, and
  10~100 parts of an acid and alkali-resistant agent.

Preferably, the efficient waterborne nano-silicon rubber sealing waterproof agent comprises following components in parts by weight:
  50~90 parts of the nano-silica gel,
  60~100 parts of the nano-diatomaceous earth,
  50~100 parts of the nano polyurethane,
  50~80 parts of the nano inorganic dry powder,
  50~100 parts of the nano methyl cellulose,
  60~110 parts of the chelating agent,
  20~60 parts of the expansion agent,
  50~80 parts of the strengthening agent,
  20~60 parts of the antifreezing agent,
  30~80 parts of the heat-resistant agent, and
  20~60 parts of the acid and alkali-resistant agent.

Preferably, the efficient waterborne nano-silicon rubber sealing waterproof agent comprises following components in parts by weight:
  80 parts of the nano-silica gel,
  100 parts of the nano-diatomaceous earth,
  50 parts of the nano polyurethane,
  55 parts of the nano inorganic dry powder,
  58 parts of the nano methyl cellulose,
  80 parts of the chelating agent,
  30 parts of the expansion agent,
  55 parts of the strengthening agent,
  30 parts of the antifreezing agent,
  35 parts of the heat-resistant agent, and
  30 parts of the acid and alkali-resistant agent.

Preferably, the chelating agent is one or more of tartaric acid, maleic acid, hydroxyl ethylene dinitrilotetra-acetic acid, tetrasodium ethylene diamine tetraacetic acid and disodium ethylene diamine tetraacetic acid.

Preferably, the chelating agent is CX34.

Preferably, the expansion agent is one or more of aluminium oxide, aluminium potassium sulfate and calcium silicate.

Preferably, the expansion agent is SY-K fiber expansion agent.

Preferably, the strengthening agent is putty powder.

Preferably, the antifreezing agent is methanol, ethylene glycol, propylene glycol and glycerol.

Preferably, the antifreezing agent is early strength and high efficient antifreezing agent.

Preferably, the heat-resistant agent is one or more of ethylene propylene diene monomer, N-phenyl maleimide, polyphenylene sulfide, polyimide, heat-resistant epoxy resin, polyformaldehyde and polytriazine.

Preferably, the heat-resistant agent is ASIBO-H801CT.

Preferably, the acid and alkali-resistant agent is mica powder or YH250-P acid-resistant agent.

Compared with the prior art, the advantages of the present invention are as follows: the waterproof agent of the present invention has characteristics of rapid leakage repairing, waterproofness, firmness, durability, no toxicity, no odor, no radiance, heat resistance, freezing tolerance, acid resistance, alkali resistance, oil resistance, green and environmental protection, and solves problem of waterproof and leak reparing fundamentally. Besides, the waterproof agent has good waterproofness, permeability, film forming property, elasticity, adhesion, water resistance and heat, humid and high temperature resistance, is suitable for being used for waterproof, anti-seepage and anti-leakage repair projects of underground engineering and roofing, and is an excellent vapor barrier material in a refrigerating chamber.

The waterproof agent of the present invention has following characteristics:

1. The waterproof agent is of waterborne single component, high temperature resistance, strong anti-freezing ability, no toxicity, no odor, no radiance, acid resistance, alkali resistance, oil resistance, green and environmental protection, easy construction, and belongs to environmental high polymer waterproof material.

2. Integrated seamless rubber and plastic layer are formed after painting and film forming, and the waterproof agent has high elongation, high extension strength and good waterproof effect.

3. The waterproof agent has liquid construction at room temperature, no joint, no blistering, and has superiority over construction places with complicated structure, nonflammable and no open flames.

4. The waterproof agent has excellent characteristics of film waterproof and permeability waterproof, good waterproofness, film-forming property and high and low temperature resistance, excellent adhesion, permeability, anti-ultraviolet ability and anti-ageing ability. This film has stronger anti-ozone and anti-ultraviolet ability, and aging life is over 50 years.

5. Construction workshop is not limited, moisture content requirement of basement layer is low and construction can be performed if the moisture content is smaller than 20%. Rolling brush can be performed on any substrate, the construction is simple and no thick coating is needed, waterproof can be airtight and continuous rubber waterproof layer can be formed.

6. Compared with traditional SBS or polyurethane waterproof material, temperature subject range is wider, especially under sub-zero condition, elasticity is constant, binding strength is stronger, and it is immune to fire.

7. The effect is the best for waterproof and repairing engineering of toilet and bathroom, pool and wall.

8. Cold construction, convenient construction and can be painted or sprayed.

9. Various colors can be batch prepared based on customers' requirements.

The application scope of the waterproof agent is as follows:

1. It is used for waterproof engineering of new and old roof, glazed tile and steel structure factory building.

2. It is used for anti-seepage and anti-proof engineering of facade outer wall and novel wall.

3. It is used for waterproof engineering of bridges, tunnels and air-raid shelters.

4. Hollowing, falling off and crack can be prevented using special coating for organic silicon to mix with cement to treat roof, wall and indoor ceiling and has good cohesiveness.

5. It can be used for waterproof of special and complicate engineering project.

6. This product can be used together with other waterproof materials for treatment of waterproof wet base, and can be used independently as waterproof layer for various waterproof of buildings, various waterproof layers, damp-proof and waterproof of undergrounding buildings, anti-seepage of kitchen and toilet, anti-seepage of pool and swimming pool, waterproof and anticorrosion of underground pipeline and coating protection of color steel tile. The waterproof agent replaces SBS roll and polyurethane waterproof material to be used for waterproofing of special structures such as roofing, toilet, basement, swimming pool, pipeline, slope top and sports buildings. The waterproof agent can be painted with the shape and no missing.

DETAILED DESCRIPTION OF THE PRESENT INVENTION

The present invention is further described in detail in combination with embodiments.

Embodiment 1

The efficient waterborne nano-silicon rubber sealing waterproof agent of the embodiment comprises following components in parts by weight:
  10 parts of nano-silica gel,
  10 parts of nano-diatomaceous earth,
  5 parts of nano polyurethane,
  15 parts of nano inorganic dry powder,
  10 parts of nano methyl cellulose,
  10 parts of a chelating agent,
  15 parts of an expansion agent,
  10 parts of a strengthening agent,
  5 parts of an antifreezing agent,
  2 parts of a heat-resistant agent, and
  10 parts of an acid and alkali-resistant agent.

The chelating agent is German CX34, the expansion agent is SY-K fiber expansion agent, the strengthening agent is putty powder, the antifreezing agent is early strength and high efficient antifreezing agent, the heat-resistant agent is type ASIBO-H801CT, and the acid and alkali-resistant agent is YH250-P.

The construction procedure of the waterproof agent of this embodiment is as follows:

(1) Roller coating method is generally adopted, the waterproof agent should be stirred evenly before using, and it should not be used with watering;

(2) The painting direction and length should be consistent, and it should be painted sequentially, uniformly and completely.

(3) Each process should be performed after the last painting is solidified and dried.

(4) The laying direction of cloth and blank pressing width should be performed based on international requirements, and the cloth should be laid smoothly and beautiful. Besides, no wrinkle and bulking are needed;

(5) A layer of carcass cloth should be added on places such as drain gully, pipe root etc. to strengthen waterproof strength;

(6) A protective layer with water and cement mortar of 1:2.5 and thickness of over 2 mm should be wiped, compact and smooth on frequently treaded and touched waterproof layer, so that the mortar is firmly bond with the waterproof material;

(7) For waterproofing of wall façade, fine sand should be spread uniformly and immediately after brushing the last painting, sticking firmly after drying and solidifying.

In conclusion, the construction of the waterproof agent of this embodiment is as follows: mixing the powder with the emulsion, performing chemical reaction, thereby permeating into pore inside the substrate, integrating with the substrate and forming a layer of waterproof layer with compact crystal. The waterproof layer can close channel and permeation of water, and waterproof effect is reached. Each layer should be criss-crossing operated back and forth over and over again, the time interval between each layer is subject to non-stick of the last layer, the back layer should be painted after the last layer is dried. Reinforcement can be performed by adding carcass on important places or places for special treatment such as flashing, expansion joint and eaves gutter, and protective layer and other covering layers can be made after the waterproof layer is completed.

The advantages of the waterproof agent of this embodiment are as follows: the waterproof agent can be applied on various humid and dry base surfaces, has advantages of long service life, weather resistance, ageing resistance, oil resistance, certain acid resistance, excellent waterproof property, no toxicity, no odor, no pollution, safe and easy construction and short time, and is the first-degree waterproof material. To be more specific, the advantages include: 1. the waterproof agent utilizes water as dispersion medium to prepare high elastic emulsion type material, and the emulsion type material has no simulated odor, no toxicity, no pollution to the environment, and is safe and reliable; 2. Coating can be performed at room temperature, and continuous, elastic, seamless and integral paint film waterproof layer is easily formed; 3. The paint film has higher tensile strength, larger elongation at break, stronger adaptability to extension or crack and deformation of base layer, good weather resistance and longer service life.

The waterproof agent of this embodiment is mainly applied in waterproof of underground engineering and engineering such as toilet and bathroom, reservoir and roof. However, the thickness of film waterproof layer must reach prescribed requirements by the standard. The waterproof agent is also applied in waterproof, dampproof and anticorrosion engineering such as various industries, civil building, toilet, kitchen, roof, roof gutter, balcony, outer wall, basement, pool, sewer, mine, tunnel, bridge crack pouring and pouring expansion joint. Moreover, the tile and crack of outer wall can be painted with the waterproof agent to block water seepage.

Embodiment 2

The efficient waterborne nano-silicon rubber sealing waterproof agent of the embodiment comprises following components in parts by weight:
 80 parts of the nano-silica gel,
 100 parts of the nano-diatomaceous earth,
 50 parts of the nano polyurethane,
 55 parts of the nano inorganic dry powder,
 58 parts of the nano methyl cellulose,
 80 parts of the chelating agent,
 30 parts of the expansion agent,
 55 parts of the strengthening agent,
 30 parts of the antifreezing agent,
 35 parts of the heat-resistant agent, and
 30 parts of the acid and alkali-resistant agent.

The chelating agent is German CX34, the expansion agent is SY-K fiber expansion agent, the strengthening agent is putty powder, the antifreezing agent is early strength and high efficient antifreezing agent, the heat-resistant agent is type ASIBO-H801CT, and the acid and alkali-resistant agent is YH250-P.

The construction form of the efficient waterborne nano-silicon rubber sealing waterproof agent of the embodiment refers to embodiment 1.

Embodiment 3

The efficient waterborne nano-silicon rubber sealing waterproof agent of the embodiment comprises following components in parts by weight:
 90 parts of the nano-silica gel,
 100 parts of the nano-diatomaceous earth,
 150 parts of the nano polyurethane,
 200 parts of the nano inorganic dry powder,
 100 parts of the nano methyl cellulose,
 150 parts of the chelating agent,
 200 parts of the expansion agent,
 250 parts of the strengthening agent,
 100 parts of the antifreezing agent,
 150 parts of the heat-resistant agent, and
 100 parts of the acid and alkali-resistant agent.

The chelating agent is German CX34, the expansion agent is SY-K fiber expansion agent, the strengthening agent is putty powder, the antifreezing agent is early strength and high efficient antifreezing agent, the heat-resistant agent is type ASIBO-H801CT, and the acid and alkali-resistant agent is YH250-P.

The construction form of the efficient waterborne nano-silicon rubber sealing waterproof agent of the embodiment refers to embodiment 1.

Above disclosure are merely some preferred embodiments of the present invention, those skilled in the art may change embodiments and application based on idea of the present invention, and the description shall not be understood as limitation to the present invention.

The invention claimed is:

1. A waterborne nano-silicon rubber sealing waterproof agent, characterized in that the waterproof agent comprises following components in parts by weight:
 10-90 parts of nano-silica gel,
 10-100 parts of nano-diatomaceous earth,
 5-150 parts of nano-polyurethane,
 15-200 parts of nano-inorganic dry powder,
 10-100 parts of nano-methyl cellulose,
 10-150 parts of a chelating agent,
 15-200 parts of an expansion agent,
 10-250 parts of a strengthening agent,
 5-100 parts of an antifreezing agent,
 2-150 parts of a heat-resistant agent, and
 10-100 parts of an acid and alkali-resistant agent.

2. The waterborne nano-silicon rubber sealing waterproof agent according to claim 1, characterized in that the waterproof agent comprises following components in parts by weight:
 50-90 parts of the nano-silica gel,
 60-100 parts of the nano-diatomaceous earth,
 50-100 parts of the nano-polyurethane,
 50-80 parts of the nano-inorganic dry powder,
 50-100 parts of the nano-methyl cellulose,
 60-110 parts of the chelating agent,
 20-60 parts of the expansion agent,
 50-80 parts of the strengthening agent,
 20-60 parts of the antifreezing agent,
 30-80 parts of the heat-resistant agent, and
 20-60 parts of the acid and alkali-resistant agent.

3. The waterborne nano-silicon rubber sealing waterproof agent according to claim 2, characterized in that the waterproof agent comprises following components in parts by weight:
 80 parts of the nano-silica gel,
 100 parts of the nano-diatomaceous earth,
 50 parts of the nano-polyurethane,
 55 parts of the nano-inorganic dry powder,
 58 parts of the nano-methyl cellulose,
 80 parts of the chelating agent,
 30 parts of the expansion agent,
 55 parts of the strengthening agent,
 30 parts of the antifreezing agent,
 35 parts of the heat-resistant agent, and
 30 parts of the acid and alkali-resistant agent.

4. The waterborne nano-silicon rubber sealing waterproof agent according to claim 1, characterized in that the chelating agent is selected from the group consisting of tartaric acid, maleic acid, hydroxyl ethylene dinitrilotetra-acetic acid, tetrasodium ethylene diamine tetraacetic acid and disodium ethylene diamine tetraacetic acid.

5. The waterborne nano-silicon rubber sealing waterproof agent according to claim 2, characterized in that the chelating agent is selected from the group consisting of tartaric acid, maleic acid, hydroxyl ethylene dinitrilotetra-acetic acid, tetrasodium ethylene diamine tetraacetic acid and disodium ethylene diamine tetraacetic acid.

6. The waterborne nano-silicon rubber sealing waterproof agent according to claim 3, characterized in that the chelating agent is selected from the group consisting of tartaric acid, maleic acid, hydroxyl ethylene dinitrilotetra-acetic acid, tetrasodium ethylene diamine tetraacetic acid and disodium ethylene diamine tetraacetic acid.

7. The waterborne nano-silicon rubber sealing waterproof agent according to claim 1, characterized in that the expansion agent is selected from the group consisting of aluminium oxide, aluminium potassium sulfate and calcium silicate.

8. The waterborne nano-silicon rubber sealing waterproof agent according to claim 2, characterized in that the expansion agent is selected from the group consisting of aluminium oxide, aluminium potassium sulfate and calcium silicate.

9. The waterborne nano-silicon rubber sealing waterproof agent according to claim 3, characterized in that the expansion agent is selected from the group consisting of aluminium oxide, aluminium potassium sulfate and calcium silicate.

10. The waterborne nano-silicon rubber sealing waterproof agent according to claim 1, characterized in that the strengthening agent is putty powder.

11. The waterborne nano-silicon rubber sealing waterproof agent according to claim 2, characterized in that the strengthening agent is putty powder.

12. The waterborne nano-silicon rubber sealing waterproof agent according to claim 3, characterized in that the strengthening agent is putty powder.

13. The waterborne nano-silicon rubber sealing waterproof agent according to claim 1, characterized in that the antifreezing agent is selected from the group consisting of methanol, ethylene glycol, propylene glycol and glycerol.

14. The waterborne nano-silicon rubber sealing waterproof agent according to claim 2, characterized in that the antifreezing agent is selected from the group consisting of methanol, ethylene glycol, propylene glycol and glycerol.

15. The waterborne nano-silicon rubber sealing waterproof agent according to claim 3, characterized in that the antifreezing agent is selected from the group consisting of methanol, ethylene glycol, propylene glycol and glycerol.

16. The waterborne nano-silicon rubber sealing waterproof agent according to claim 1, characterized in that the heat-resistant agent is selected from the group consisting of ethylene propylene diene monomer, N-phenyl maleimide, polyphenylene sulfide, polyimide, heat-resistant epoxy resin, polyformaldehyde and polytriazine.

17. The waterborne nano-silicon rubber sealing waterproof agent according to claim 2, characterized in that the heat-resistant agent is selected from the group consisting of ethylene propylene diene monomer, N-phenyl maleimide, polyphenylene sulfide, polyimide, heat-resistant epoxy resin, polyformaldehyde and polytriazine.

18. The waterborne nano-silicon rubber sealing waterproof agent according to claim 3, characterized in that the heat-resistant agent is selected from the group consisting of ethylene propylene diene monomer, N-phenyl maleimide, polyphenylene sulfide, polyimide, heat-resistant epoxy resin, polyformaldehyde and polytriazine.

19. The waterborne nano-silicon rubber sealing waterproof agent according to claim 1, characterized in that the acid and alkali-resistant agent is mica powder.

20. The waterborne nano-silicon rubber sealing waterproof agent according to claim 2, characterized in that the acid and alkali-resistant agent is mica powder.

21. The waterborne nano-silicon rubber sealing waterproof agent according to claim 3, characterized in that the acid and alkali-resistant agent is mica powder.

* * * * *